United States Patent [19]

Cooper et al.

[11] 3,821,185

[45] June 28, 1974

[54] HETEROPOLYSACCHARIDES AS STRIPPING ACIDS IN RECOVERY OF POLYMER FROM SOLUTION

[75] Inventors: Earl D. Cooper; Dick S. Hall, both of Bartlesville, Okla.

[73] Assignee: Phillips Petroleum Company, Bartlesville, Okla.

[22] Filed: Sept. 18, 1972

[21] Appl. No.: 289,865

[52] U.S. Cl.......... 260/94.7 R, 260/85.1, 260/96 R, 260/94.2 R, 260/94.3
[51] Int. Cl.............................. C08d 500, C08d 502
[58] Field of Search..... 260/94.7 R, 94.7 A, 94.2 R, 260/94.2 M, 94.3

[56] References Cited
UNITED STATES PATENTS 3,661,872    5/1972    Short et al.......................... 260/85.1

*Primary Examiner*—Joseph L. Schofer
*Assistant Examiner*—William F. Hamrock

[57] ABSTRACT

Heteropolysaccharides, such as those derived from bacterial fermentation processes employing the genus Xanthomonas, are effective as stripping aids to obtain good rubber crumb by steam-stripping a solution of rubber-in-hydrocarbon solvent.

12 Claims, No Drawings

3,821,185

HETEROPOLYSACCHARIDES AS STRIPPING ACIDS IN RECOVERY OF POLYMER FROM SOLUTION

FIELD OF THE INVENTION

The invention relates to the recovery of polymers from solution.

BACKGROUND OF THE INVENTION

In the production of rubbery materials by polymerization of one or more polymerizable monomers in the presence of a hydrocarbon solvent by means of organometal initiators, the product is obtained as a substantially rubber-in-hydrocarbon solvent solution. Of various recovery processes suggested, steam stripping has been most widely used on a commercial basis.

It is desired to obtain the polymer in the form of a rubber crumb as a slurry in water. The crumb then can be readily removed by filtration, pressing, and final drying of the rubber.

A variety of agents has been suggested to assist in forming a crumb of proper particle size with minimum tendency to coalesce or for the particles to stick together, or, for that matter, to stick to the apparatus. Various surface active agents have been suggested, generally requiring the employment, in addition, of various inorganic salts. However, better methods, simpler methods, reduced number of additives, are desired. Particularly, is it desired to use stripping aids which would be biodegradable.

OBJECTS OF THE INVENTION

It is an object of the invention to improve the recovery of polymers from hydrocarbon solution. It is another object of the invention to provide stripping aids for polymer crumb recovery which are essentially biodegradable.

Other objects and advantages of our invention will be apparent to one skilled in the art upon reading this disclosure.

BRIEF SUMMARY OF THE INVENTION

Steam stripping of rubber-in-hydrocarbon solvent solution with the aid in the aqueous phase of a heteropolysaccharide, preferably produced from the genus Xanthomonas, more preferably from the bacterium *Xanthomonas campestris*, produces rubber crumb of a suitable small particle size which exhibits little tendency to coalesce or to stick together, is easily transported as an aqueous slurry, and that does not stick to the apparatus. The stripping aid is biodegradable, and requires no inorganic salt or additive.

DETAILED DESCRIPTION OF THE INVENTION

In the processes to which our invention is applicable, a rubbery polymer is formed by a polymerization of one or more polymerizable monomers in a hydrocarbon solvent by employing organometal initiators. The rubbery polymer is obtained as a substantially rubber-in-solvent solution or dispersion of about 5 to 15 per cent rubber by weight, though broadly other weight compositions can be obtained depending on the monomer, degree of polymerization of the rubber, the molecular weight, and the like, such as from 1 to 25 per cent rubber. The higher concentrations tend to present greater difficulties in mixing the rubber solution with the water, though they also permit handling more rubber with less solvent.

In the steam stripping rubber recovery operation, the rubber-in-solvent solution is brought to the intermediate portion of the stripper. Water, together with a dispersant or stripping aid, is sprayed into the stripper by spray nozzles. The stripper is equipped with a phase separation means, water removal means, solvent removal means, and a steam supply as well as necessary temperature and other controls.

The stripping operation can be in one or in multiple stages, though usually in two stages, the first stage operating at such as about 200° F., the second stage at such as about 220° F., though these are temperatures subject to variations depending on the rubber, sensitivity, solvent volatility, amount of solvent to be removed, and the like. The hydrocarbon solvent is recovered and can be recycled to the polymerization stage. The water is recovered and can be recycled to the first stripper section. The system is operated to give a final solvent content in the rubber usually below about 1 weight per cent. The stripped crumb recovered can be sent to a separator as a convenient-to-handle the crumb-in-water slurry, the water removed by suction, vacuum, and the like, and the rubber then sent on to be dried, baled and packaged, or to be used for compounding. The process and equipment are well known in the art and need not be further described.

STRIPPING AIDS

The stripping aids which we employ are termed high molecular weight heteropolysaccharides or xanthan gums. These heteropolysaccharides possess properties which, we have discovered, render them particularly effective as stripping agents in the recovery of rubber crumb from a solution of rubber-in-hydrocarbon solvent by means of steam stripping operations. These heteropolysaccharides are unaffected by and do not require ionic materials otherwise formerly required as coadditives with other types of stripping agents.

The heteropolysaccharides are used in the stripping operation in small effective amounts sufficient to provide the results desired. The amounts employed can range widely depending on rubber, ratios of solvent and water, temperatures and the like. Typically, a broad range or about 0.01 to 2, preferably 0.1 to 1, parts by weight per 100 parts of rubber recovered. More difficult-to-strip rubbery compositions may require up to 2 parts or more, and with some rubbers it may be possible to employ less than 0.1 part. Presently more preferred for most operations is about 0.3 to 0.6.

The additives can be added along with the water to the stripper, or separately, as desired. The aids can be employed as a dispersed form in water at any convenient-to-handle concentration. Other solvents or dispersing fluids, such as the rubber hydrocarbon solvent, can be employed. The stripping aids of our invention are soluble and stable in solutions containing acids or alkali, which may be employed where convenient or desirable for particular aspects. The colloids are compatible with salts found in most natural waters, where such are employed for stripping operations, though particularly hard water usually is avoided to avoid contamination of the rubber itself.

The high molecular weight heteropolysaccharides employed in the process of our invention can be produced by any suitable method of synthesis. The heteropolysaccharides can be formed by the bacterial fermentation of simple carbohydrates, such as by the action of bacteria of the genus Xanthomonas upon a variety of carbohydrate substances as substrates including simple sugars such as glucose and fructose, as well as sucrose, and the various starches. Representative of these bacteria are *Xanthomonas campestris, Xanthomonas phaseoli, Xanthomonas malvacearium, Xanthomonas carotae, Xanthomonas translucens, Xanthomonas hederae* and *Xanthomonas papavericola*. All of these organisms may not necessarily produce heteropolysaccharides with equal effectiveness with every substrate. Hence, certain species of the bacteria may be more attractive for synthesizing the heteropolymers than are others. *Xanthomonas campestris* is a particularly effective species. *Xanthomonas campestris* NRRL B-1459 is a presently preferred bacterium.

Conveniently, such materials can be readily produced by any of the organisms described by conventional fermentation processes employing carbohydrate substrates. While description of our process and invention will be described more particularly with reference to *Xanthomonas campestris* designated as NRRL B-1459, and products obtained therefrom, it is understood that similar and useful products can be obtained from any of the Xanthomonas genus organisms. Our use as exemplary of the particular method of production using a particular bacterium is intended to be illustrative, and not limitative of our invention.

The heteropolysaccharide product can be obtained by the whole culture fermentation of a medium containing about 2 to 5 per cent glucose, nitrogen source, a phosphate, and appropriate trace elements, for incubation times of up to 96 hours at about 28° C. under aerobic conditions. The whole culture is centrifuged to remove salts, subjected to precipitation by methanol in the presence of electrolytes such as potassium chloride, reprecipitated if necessary, and finally the fibrous gum finally dehydrated with methanol, though other methods of purification are satisfactory.

The finally obtained heteropolysaccharides contain mannose, glucose, glucuronic radicals, and acetyl radicals, in the approximate molar ratio of 2:1:1:1. The polysaccharides can be obtained as a gum or as a soft bulky powder, slightly colored by pigment from the culture. Either form of product swells and dissolves substantially completely in cold water. In aqueous solution, the material is opalescent, nonthixotropic, and exhibits soft gelation. Normal pH of the material is in the range of about 7 to 8.5 at concentrations of 0.1 to 1 per cent. The polysaccharides can be deacetylated by treatment with dilute alkali at room temperature with exclusion of oxygen. The products are commercially available in various grades and various modifications to exhibit various viscosities. The gum form, solid form, natural or deacetylated form, all can be used in the context of our invention.

While the dry products are resistant to bacterial action, solutions may be subject to such action during prolonged storage, and it may be advisable to use very small amounts of preservatives. Production of the colloid is described in such patents as U.S. Pat. Nos. 3,244,695 and 3,256,271. These patents also describe modifications of the colloids which can be made, all of which are employable in the context of our invention.

EXAMPLES

The examples below describe the employment of the additives as stripping aids in rubber crumb recovery. Particular amounts employed, particular rubbers, monomeric components thereof, and the like, are intended to be illustrative of our invention, and not limitative of the proper scope thereof.

EXAMPLE I

Runs were made and the polymer recovered with and without our stripping aid. The polymer was a polybutadiene of about 92 per cent cis 1,4-addition prepared with an initiator system of triethyl aluminum, titanium tetrachloride, and iodine, in a toluene solvent, short-stopped with rosin acid, and stabilized with an antioxidant 2,2'-methylene bis(4-methyl-6-tertiary-butylphenol). The rubber described is available as Cis-4, a trademark of Phillips Petroleum Company.

The polybutadiene-in-toluene solution was introduced into a single stage stripping zone maintained approximately one-third full of water. A large part of the solvent quickly flashed off, leaving rubber containing remaining solvent in the aqueous phase in the stripping zone. The stripper was operated at about 230° F.

On startup, stripping aid was added to the stripper water batchwise. The polybutadiene-in-toluene cement was added at the rate of 1.5 pound/minute through a 1-inch S & K steam jet to the 90-gallon stripper until a 7 weight per cent crumb concentration was reached. Then, continuous addition of dispersing agent and takeoff of precipitated polymer were begun while continuing polymer cement feed at a rate sufficient to give a residence time of about 35 minutes. The feed was continued for three hours for the system to stabilize before a polymer sample was recovered or a crumb size determination was recorded.

The stripping aid employed was a high molecular weight linear polysaccharide or xanthan gum characterized by a molecular weight in excess of one million with B-linked backbone containing D-glucose, D-mannose, and D-glucaronic acid with one D-mannose side chain unit for every eight sugar residues and one D-glucose side chain unit for every 16 sugar residues; partially acetylated and containing pyruvic acid attached to the glucose sidechain; a molar ratio of D-glucose to D-mannose to D-glucaronic acid of about 2.8:3:2; available as Kelzan from Kelco Co., Chicago.

When no additive was used, no rubber crumb was obtained and the stripper plugged. The rubber precipitated as a sticky mass. When the heteropolysaccharide was used, small crumb size was obtained with 1 phr xanthan gum, and very large crumb size was obtained with 0.2 phr. These runs illustrate the effectiveness of our stripping aids, and further illustrate the ready control of crumb size obtainable by use of our stripping aids.

EXAMPLE II

Polymer prepared by the polymerization method described in Example I was recovered in a two-stage stripping zone. Each stripping zone was a 100 gallon tank containing water approximately at the 40-gallon level. The temperature in the first stripper was about 204° F., and in the second stripper was about 214° F., with a crumb slurry concentration maintained at approximately 3 weight per cent. Polymer-solution feed rate was maintained at about 18.2 pounds/hour to give a residence time of about 30 minutes in each stripper stage. The xanthan gum described in Example I was employed in successive runs at 0.2, 0.42 and 1 phr, and produced a 1/8-inch to 1/4-inch crumb size, but with the appearance of broken bubbles at a level of 0.2 phr. The crumb does not block when stored as wet stripper crumb, staying as discrete crumb particles in a water slurry. The build up in the stripper vessels was minimal and very easily removed.

Comparative runs were made with the sodium salt of a copolymer of diisobutylene and maleic anhydride as described in U.S. Pat. No. 3,190,868, but this aid required use of an inorganic salt as co-additive, was not biodegradable, and the resulting crumb tended to block when stored.

Crumb samples prepared at xanthan gum levels of 0.2, 0.42 and 1 phr were dried and evaluated in a test recipe containing:

| | |
|---|---|
| Polymer | 100 |
| HAF carbon black | 60 |
| Naphthenic Oil[(1)] | 15 |
| Zinc oxide | 3 |
| Stearic acid | 2 |
| Sulfur | 1.5 |
| N-tert-butyl-2-benzothiazolesulfenamide | 0.9 |

(1) Naphthenic oil having 47.5% aromatics, viscosity (100° F.) of 2525 SUS, flash point 430° F. and aniline point of 172° F.

The Mooney (ML-4) at 212° F. was 44 of the rubber recovered with the stripping aid added in concentration of 0.2, 0.42 and 1 phr. Without the stripping aid the Mooney (ML-4) at 212° F. was 45.

The properties were very good compared to either the control or to a commercial polybutadiene. The heat build-up ($\Delta T$) ASTM-D-623-62, Method A was measured using a Goodrich Flexometer at 143 lb/sq. inch load and 0.175-inch stroke, and a specimen in the form of a circular cylinder 0.7 inch in diameter and 1 inch high. The heat build-up of the rubber cured for 35 minutes was 68.7° F.; with 1 phr xanthan gum was 63.7° F.; with 0.42 phr polysaccharide was 62.5° F.; and with 0.2 phr was 65.8° F.

The data indicated that the stripping aid of our invention had no undesirable effects on the processing or physical properties of the polybutadiene.

Aging of the raw polymer for 20 weeks at 160° F. resulted in good properties for the rubber containing 0.42 and 1 phr polysaccharide though the rubber containing only 0.2 phr polysaccharide was not fully stable after aging 20 weeks at 160° F.

In our process, rubber crumb can be effectively recovered from various types of rubber in solution. Such rubbery polymers can be prepared, for example, by polymerizing a monomer system containing one or more polymerizable conjugated dienes, such as of four to 12 carbon atoms per molecule. Examples of conjugated dienes include 1,3-butadiene, isoprene, 2,3-dimethylbutadiene, 2-methoxybutadiene, 1,3-hexadiene, and 1,3-octadiene. These conjugated dienes can be polymerized either alone or in admixture with each other and/or with one or more other compounds containing an active

group copolymerizable therewith including styrene, acrylonitrile, methyl acrylate, methyl methacrylate, vinyl chloride, methyl vinyl ether, ethylene, propylene, 1-butene, 1-propene, 1-octene and the like, preferably employing a major proportion of conjugated diene so as to obtain a product of rubbery character. Presently important are polymers such as cis-polybutadiene, transpolybutadiene, cis-polyisoprene, trans-polyisoprene, and polybutadiene formed by approximately equal amounts of cis and trans 1,4-addition.

Such polymers can be prepared in the presence of organic solvents including paraffins such as propane, butane, pentane, isooctane; cycloparaffins, such as cyclohexane, and methylcyclohexane; and aromatic compounds, such as benzene, toluene, and the like. The solvent is one which is normally liquid under operating conditions employed, which will dissolve the polymer, and which can be vaporized in the presence of steam or hot water.

A large number of initiator systems are suitable for the production of the polymers. One type of initiator system is a two or more component catalyst wherein one component is an organometal compound, including those where one or more organo groups is replaced by a halogen; a metal hydride; or a metal of Group I, II or III; and the second component is a Group IV to VI compounds, e.g., salt or alcoholate. This type of initiator system is described with examples in columns 5 through 8 of U.S. Pat. No. 2,886,561, dated May 12, 1959.

Another suitable initiator system is represented by the formula $R(Li)_x$ in which R is an aliphatic, cycloaliphatic, aromatic, or combination hydrocarbon radical, and $x$ is an integer of 1 to 4. The aliphatic and cycloaliphatic radicals can be saturated or contain olefinic unsaturation. The R in the formula has a valence equal to the integer, and preferably contains from 1 to 20, inclusive, carbon atoms, although higher molecular weight compounds can be used. Examples include methyllithium, n-butyllithium, tert-octyllithium, n-decyllithium, phenyllithium, naphthyllithium, cyclohexyllithium, 1,4-dilithiobutane, 1,20-dilithioeicosane, 1,4-dilithio-2-butene, 9,10-dilithio-9,10-dihydroanthracene, 1,3,5-trilithiopentane, 1,2,5-trilithionaphthalene, 1,5,10,20-tetralithioeicosane, 1,2,3,5-tetralithio-4-hexylanthracene, and the like. The amount of such organolithium initiator employed can vary over a broad range, such as from 0.3 to 100 milliequivalents of lithium per 100 parts by weight of total monomers charged.

Still another initiator system utilizes a cobalt compound and an alkyl metal or alkyl metal halide wherein one but not all of the alkyl groups can be replaced by halogen. The Group III metals, as exemplified by aluminum, are used to provide the metal alkyl component. Examples of these organometal compounds include trialkylaluminums, such as triethylaluminum and triisobutylaluminum and alkyl aluminum halides, such as ethylaluminum dichloride and diethylaluminum chloride. For the cobalt compound, the cobaltous form is preferred. Examples of these compounds include cobaltous chloride, cobaltous sulfate, cobaltous nitrate, and the salts of organic acids, such as cobaltous acetate.

Certainly, reasonable variations and modifications of our invention are possible yet still within the scope of

We claim:

1. In a process for recovering a rubbery polymer prepared by polymerizing a monomer mixture containing at least a major proportion of a conjuagated diene from a rubber-in-solvent solution by steam stripping the solution to produce rubber crumb in aqueous phase after shortstopping the process of polymerizing, the improvement comprising adding during said stripping an effective stripping amount of heteropolysaccharide as stripping aid.

2. The process according to claim 1 wherein said heteropolysaccharide is characterized as an Xanthan gum derived from the genus Xanthomonas and is added in an amount sufficient to provide about 0.01 to 2 parts by weight of said Xanthan gum stripping aid per 100 parts of rubber.

3. The process according to claim 2 wherein said heteropolysaccharide is produced by the bacterial fermentation of the genus Xanthomonas on a carbohydrate substrate.

4. The process according to claim 3 wherein said rubber-in-solvent solution comprises about 1 to 25 per cent rubber in a hydrocarbon solvent, said heteropolysaccharide is added as a water dispersant during said steam stripping operation.

5. The process according to claim 3 wherein said Xanthomonas genus organism is *Xanthomonas campestris, Xanthomonas phaseoli, Xanthomonas malvacearium, Xanthomonas carotae, Xanthomonas translucens, Xanthomonas hederae*, or *Xanthomonas papavericola.*

6. The process according to claim 4 wherein said Xanthomonas species is *Xanthomonas campestris.*

7. The process according to claim 5 wherein said *Xanthomonas campestris* specie is that designated NRRL B-1459.

8. The process according to claim 3 wherein said heteropolysaccharide is characterized as an xanthan gum and is a product of the whole culture fermentation of *Xanthomonas campestris* on a glucose medium.

9. The process according to claim 8 wherein said xanthan gum contains mannose, glucose, glucuronic radicals, and acetyl radicals, in the approximate molar ratio of 2:1:1:1.

10. The process according to claim 9 wherein said so obtained heteropolysaccharide is a deacetylated heteropolysaccharide.

11. The process according to claim 4 wherein said rubber is a homopolymer or copolymer of at least one conjugated diene containing from 4 to 8 carbon atoms per molecule or copolymer of at least one thereof with a copolymerizable monomer containing an active

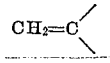

group.

12. The process according to claim 11 wherein said polymer is polybutadiene and wherein said steam stripping operation employs at least one stage, and the final solvent content of the rubber crumb obtained is below about 1 weight per cent.

* * * * *

UNITED STATES PATENT OFFICE
CERTIFICATE OF CORRECTION

Patent No. 3,821,185                     Dated June 28, 1974

Inventor(s) Earl D. Cooper et al.

It is certified that error appears in the above-identified patent and that said Letters Patent are hereby corrected as shown below:

Column 8, line 7, "3" should read -- 5 --.

Signed and sealed this 17th day of December 1974.

(SEAL)
Attest:

McCOY M. GIBSON JR.              C. MARSHALL DANN
Attesting Officer                Commissioner of Patents